Nov. 10, 1931.    L. H. THOEN    1,831,208
THRASHER
Original Filed Nov. 2, 1927
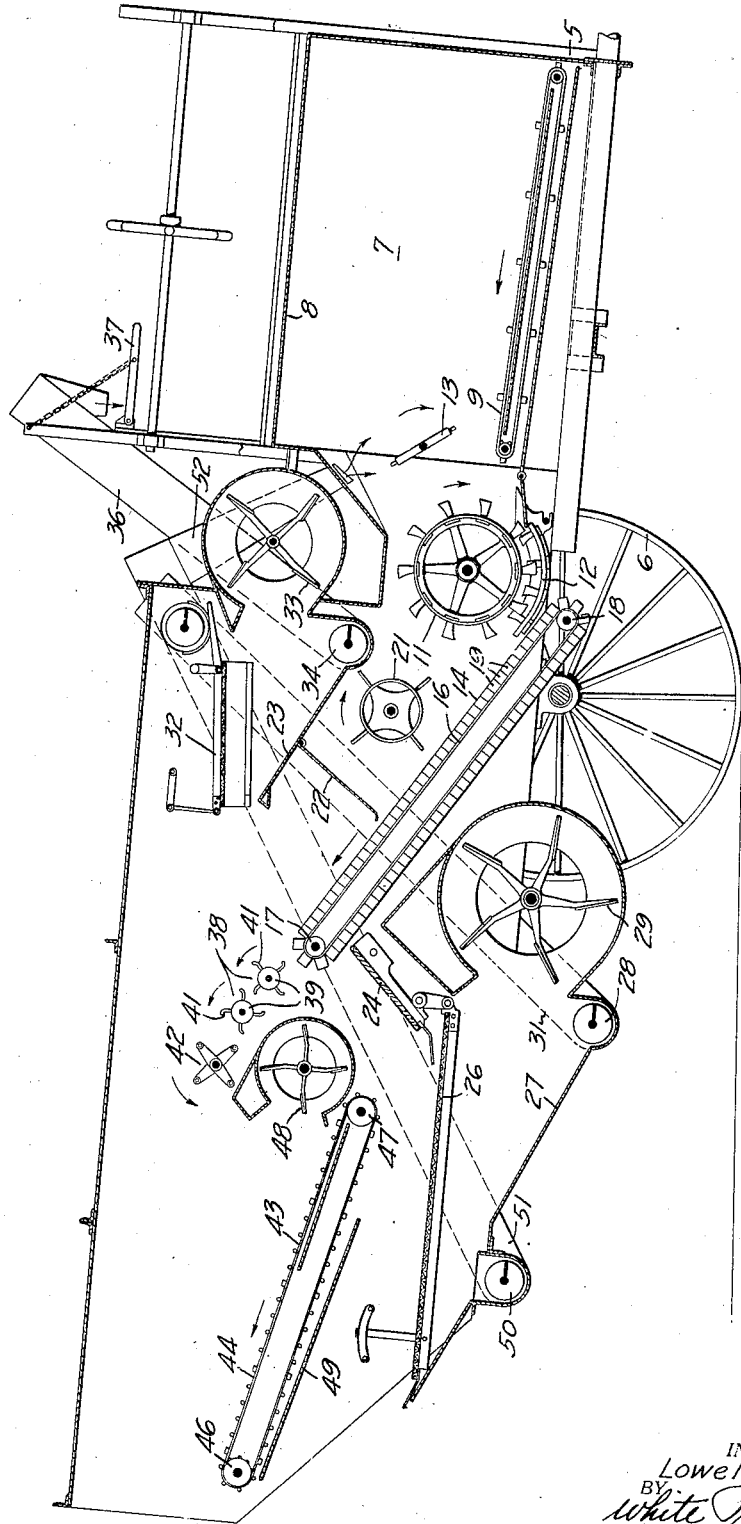
INVENTOR
Lowell H. Thoen
BY
White, Prost & Fryer
ATTORNEYS Patented Nov. 10, 1931

1,831,208

UNITED STATES PATENT OFFICE

LOWELL H. THOEN, OF STOCKTON, CALIFORNIA, ASSIGNOR, BY MESNE ASSIGNMENTS, TO CATERPILLAR TRACTOR CO., OF SAN LEANDRO, CALIFORNIA, A CORPORATION OF CALIFORNIA

THRASHER

Application filed November 2, 1927, Serial No. 230,456. Renewed February 7, 1930.

My invention relates to harvesting machinery and is particularly concerned with a thrasher or with the separator portion of a combined harvester which are adapted to thrash grain to segregate the kernels of grain and the straw.

An object of my invention is to increase the efficiency of thrashing mechanism.

Another object of my invention is to recover more of the grain kernels from the straw.

A further object of my invention is to facilitate the travel of the grain being thrashed thru the separating mechanism.

My invention possesses other advantageous features, some of which with the foregoing will be set forth at length in the following description where I shall outline in full that form of the thrasher of my invention which I have selected for illustration in the drawing accompanying and forming part of the present specification. In said drawing I have shown one form of thrasher embodying my invention, but it is to be understood that I do not limit myself to such form since the invention, as set forth in the claim, may be embodied in a plurality of forms.

The drawing is a section in a vertical plane thru the longitudinal axis of the separator portion of a combined harvester, portions of the mechanism being shown schematically.

In its preferred form, my invention preferably comprises means for lifting and propelling in an upward direction grain discharged from a grain carrier so that the grain is in a loose, dispersed mass and also preferably includes means for directing a current of air thru the dispersed mass of grain.

While my invention is applicable to thrashing mechanisms of various sorts, it is shown in the accompanying drawing as it is embodied in the separator unit or thrasher portion of a combined harvester which in most respects is similar to the well known Holt harvester shown in Patent No. 954,394 to B. Holt. This mechanism ordinarily includes a framework 5 supporting the machinery and mounted on wheels 6 to enable the carriage so formed to be drawn over the field of grain to be harvested. The standing grain is often cut by a header unit, as is well known, and is discharged from the draper of the header unit into the feeder house 7 of the separating mechanism. The feeder house is an enclosure bounded by walls 8 and contains a belt 9 or Jackson feeder for receiving the cut grain and conveying it toward a cylinder 11 and cooperating concave 12 mounted in the framework 5 at the end of the belt.

In addition to the Jackson feeder 9 as shown in Patent No. 206,456 to B. Jackson, there is usually provided a feeder house beater 13 operating to impel the cut grain to enter between the rapidly revolving cylinder 11 and the stationary concave 12. As the grain passes thru the cylinder and concave unit most of the heads are stripped from the straw and a large proportion of the grain kernels are dislodged. All of the grain emerging from the cylinder and concaves deposits upon the grain feeder 14. In one embodiment this comprises a belt 16 passing around a pair of parallel rollers 17 and 18 suitably journaled at different levels in the framework 5 and carrying cells 19 into which the grain kernels fall and on which the stripped straw rests.

The material dislodged from the cylinder is directed onto the grain carrier by a grain carrier beater 21 usually including a revolving drum mounted in the framework 5 and having projections engaging the straw to distribute it on the grain carrier 14. Any grain which is not properly arranged strikes against bluff boards 22 hinged to a partition 23 forming a portion of the framework and is positioned by them. The result of the treatment of the grain as so far described is that near the upper end of the inclined grain carrier, a large portion of the grain kernels are separated and lie within the cells 19 with the straw and a few still attached kernels extending across the top thereof.

As the grain carrier rounds the roller 17, the kernels contained in the cells 19 are spilled out onto a saddle board 24 and tumble onto a separator shoe 26. The separator shoe comprises a flat screen which, together with the saddle board 24, is violently agitated so that all suitable grain kernels are shaken thru the screen and fall down an incline 27 toward a grain auger 28.

To aid in the separation of suitable kernels from unsuitable grain kernels on the separator shoe 26 a fan 29 is rapidly revolved in suitable bearings in the framework 5 and directs a blast of air from the underside of the separator shoe tending to dislodge chaff and undesired portions of the grain. The grain which lies within the shell of the auger 28 is thus comparatively free from undesired particles but is further cleaned before it is discharged from the machine.

For its additional cleaning, the grain is moved transversely of the separator mechanism by the revolving grain auger and is carried thru an elevator 31 to a recleaner 32. The recleaner comprises ordinarily, an agitated screen arranged to pass only grain that has been sufficiently treated and to withhold weeds and undesired grain. The effect of the recleaner 32 is augmented by a current of air emanating from a rapidly revolving fan 33 journaled in the framework 5 and driven by the driving mechanism of the separator unit. The grain passing thru the recleaner screen drops onto the partition 23 and travels down to an auger 34 which carries it transversely of the mechanism to an elevator 36 leading to a sacking platform 37. This grain has been finally passed by the machine and is ready to be discharged therefrom. Unsuitable grain which doesn't pass thru the cleaner screen 32 discharges over the end thereof onto the grain carrier 14 and again progresses thru the primary thrashing mechanism.

It happens that in previous machines not all of the grain kernels are separated from the straw before it discharges from the grain feeder and a valuable fraction of the remaining grain kernels is not recovered. As the result of numerous experiments with mechanisms of this sort, I have discovered that by treating in a particular manner the straw discharged from the grain carrier practically all of the remaining grain kernels can be recovered therefrom.

In accordance with my invention I preferably provide a conveyor or conveyors adjacent the discharge end of the grain carrier, in this instance including a pair of pickers 38. Each picker ordinarily comprises a rapidly revolving drum 39 from which project radially a plurality of picker fingers 41. I have found that when the pickers are revolved in opposition to the grain leaving the grain carrier, they tend to force the grain downwardly and to make the straw so compact that the grain kernels therein are not readily available. In accordance with my invention I revolve the pickers in the same direction that the grain carrier revolves with the result that the straw which they engage is carried or is impelled upwardly. This action of the pickers is augmented by another conveyor comprising a beater 42 which usually includes a pair of frames disposed on an axle at 90° to each other and preferably is revolved in the same direction as the pickers and grain carrier.

The effect of the unidirectionally rotating pickers, beater, and grain carrier, is to impel upwardly the grain discharged from the grain feeder. Thus the straw is separated into a loose, dispersed mass which is very light and open and has been described as a fog of straw. The mass of loosely compacted straw permits the remaining grain kernels to drop gravitally therethru and fall onto the saddle board 24 and the separator shoe 26 or onto a straw carrier 43. This straw carrier is similar to the grain carrier in that it usually includes a belt 44 passing around a pair of rollers 46 and 47 suitably journaled in the framework 5 and revolved in the same direction as the grain carrier. The belt of the straw carrier retains the straw but is foraminous to permit the kernels to drop through onto the separator shoe 26.

Grain kernels separate readily from the loose straw mass discharged by the pickers and beater but the yield is augmented by a fan 48 installed in the framework to direct a current of air thru the loosely related and highly dispersed mass of straw passing upwardly from the pickers and beater. The current of air not only tends to dislodge any chaff which may be present but further separates the straw and aids in permitting the contained kernels to drop. Those falling on the straw carrier 43 pass thru its foraminous structure while the remaining straw, being substantially free from contained grain kernels, passes over the end of the carrier and is discharged from the thrasher.

The kernels that have passed thru the straw carrier strike a baffle 49 for directing them onto the separator shoe 26. The kernels are there violently agitated together with those arriving from the saddle board 24 and, if they are suitable, fall to the grain auger 28. The kernels not discharged from the initial portion of the separator shoe travel farther along and most of them drop thru to an auger 50. Any material failing to pass thru either the initial or the final portions of the separator shoe screen is finally discharged from the end of the machine as unfit for further treatment. The auger 50 carries the grain transversely of the machine to an elevator 51 which conducts it to a conduit 52 leading into the feeder house 7 near the beater 13. This grain is thrashed and continues its cycle until it falls thru the initial portion of the separator shoe 26 and is carried to the recleaner 32.

It is apparent that grain which is introduced into my machine is very thoroughly treated for the recovery of the grain kernels and for the separation of straw and weeds therefrom. The action and efficiency of the machine are greatly enhanced by the pickers 38 and the beater 42 together with the blower 48 which keep the straw passing from the end of the grain feeder in a loosely compacted light mass so that the residual grain kernels can fall therefrom gravitally. It is largely to this feature that I attribute the efficiency of my thrasher. I have found that my thrasher in practice leaves at the sacker platform a grain which is remarkably clean and free from contamination and that the straw discharged contains practically no grain kernels.

I claim:

A thrasher comprising a grain carrier, a pair of pickers, a beater, said pickers and said beater being substantially in line with said grain carrier, a straw carrier, means for driving said pickers and said beater to carry straw from said grain carrier over said pickers and beater to said straw carrier, and a fan substantially underneath said pickers and beater for directing a current of air over said straw carrier and thru the straw carried to said straw carrier by said pickers and beaters.

In testimony whereof I have hereunto set my hand.

LOWELL H. THOEN.